United States Patent
Beckman et al.

(10) Patent No.: US 7,828,008 B1
(45) Date of Patent: Nov. 9, 2010

(54) ONLINE PARTIAL STROKE TESTING SYSTEM USING A MODIFIED 2004 ARCHITECTURE

(75) Inventors: Lawrence V. Beckman, Houston, TX (US); Larry G. Lengyel, Katy, TX (US)

(73) Assignee: SafePlex Systems, Inc., Houston, TX (US)

( * ) Notice: Subject to any disclaimer, the term of this patent is extended or adjusted under 35 U.S.C. 154(b) by 609 days.

(21) Appl. No.: 11/349,604

(22) Filed: Feb. 8, 2006

Related U.S. Application Data

(60) Provisional application No. 60/672,721, filed on Apr. 19, 2005.

(51) Int. Cl.
*F16K 31/42* (2006.01)
(52) U.S. Cl. .............................. 137/487.5; 137/596.16; 251/26
(58) Field of Classification Search .............. 137/487.5, 137/596.17, 596.16; 251/26, 29
See application file for complete search history.

(56) References Cited

U.S. PATENT DOCUMENTS 5,217,199 A * 6/1993 Frey ............................ 251/29

2004/0093173 A1* 5/2004 Essam ........................ 702/51
2006/0191314 A1* 8/2006 Karte ......................... 73/1.72
2009/0000672 A1* 1/2009 Goll ......................... 137/487.5

FOREIGN PATENT DOCUMENTS

EP 641919 A1 * 3/1995
WO WO 2005097792 A1 * 10/2005

* cited by examiner

*Primary Examiner*—John Rivell
*Assistant Examiner*—William McCalister
(74) *Attorney, Agent, or Firm*—Buskop Law Group, PC; Wendy Buskop

(57) ABSTRACT

A system and a method for partial stroke testing of a critical valve using a bypass valve includes flowing two streams of gas simultaneously through a bypass valve, opening the critical valve with the gas from the bypass valve, and determining a calibration time interval for closing the opened critical valve to a preset partial stroke testing position. The method includes determining a measured time interval for closing the opened critical valve, creating a tolerance band, and comparing the measured time interval to determine if the critical valve passes the partial stroke testing. The system includes a two stage bypass valve, having four solenoid valves. The system includes a processor with a memory having partial stroke testing logic. Each solenoid valve and the bypass valve include a pressure sensor.

9 Claims, 4 Drawing Sheets

ONLINE PARTIAL STROKE TESTING SYSTEM USING A MODIFIED 2004 ARCHITECTURE

CROSS REFERENCE TO RELATED APPLICATIONS

The present application claims priority to co-pending U.S. Provisional Patent Application Ser. No. 60/672,721, filed on Apr. 19, 2005.

FIELD

The embodiments relate to an in situ partial stroke testing systems for the online testing of various types of critical valves.

BACKGROUND

In the oil, gas, petroleum, and power industries, various conditions can occur that necessitate immediate shutdown or tripping of the operations, processes or the entire plant. In those industries, a majority of the final control elements of the shutdown systems are implemented by using fast-acting shutdown valves. In such industries, a majority of the shutdown valves can remain open while the process is in a safe and controlled state. However, such valves should be closed or shutdown in situations where the plant experiences a trip arising from an out-of-control process or during a normal maintenance outage.

State of the art emergency shutdown systems, which are known also as Safety Instrumented Systems (SIS), can control shutdown valves, which are known as critical valves, such as emergency shutdown valves. These Safety Instrumented Systems (SIS) have a number of features to detect plant failures or individual process failures and generally include redundancies in performance of the safety system for added reliability. However, such existing safety systems have not typically provided for the preventative testing of the shutdown valves, other than by undertaking the full stroking of the critical valve at some random time period. In practicing the existing safety systems, a full stroking or a completely closing of the shutdown valves can cause an undesirable disruption in the plant processes.

A need exists for systems and methods for providing testing of shutdown valves, such as emergency valves, without undertaking full stroking of the valve or requiring the complete stopping of total operations of the plant and/or safety system.

A need exists for simple, secure, and reliable systems for testing critical valves without completely stopping the production processes of a facility, including plants, refineries, power industry operations, and combinations thereof.

The embodiments meet these needs.

BRIEF DESCRIPTION OF THE DRAWINGS

The detailed description will be better understood in conjunction with the accompanying drawings as follows.

Figure 1A:
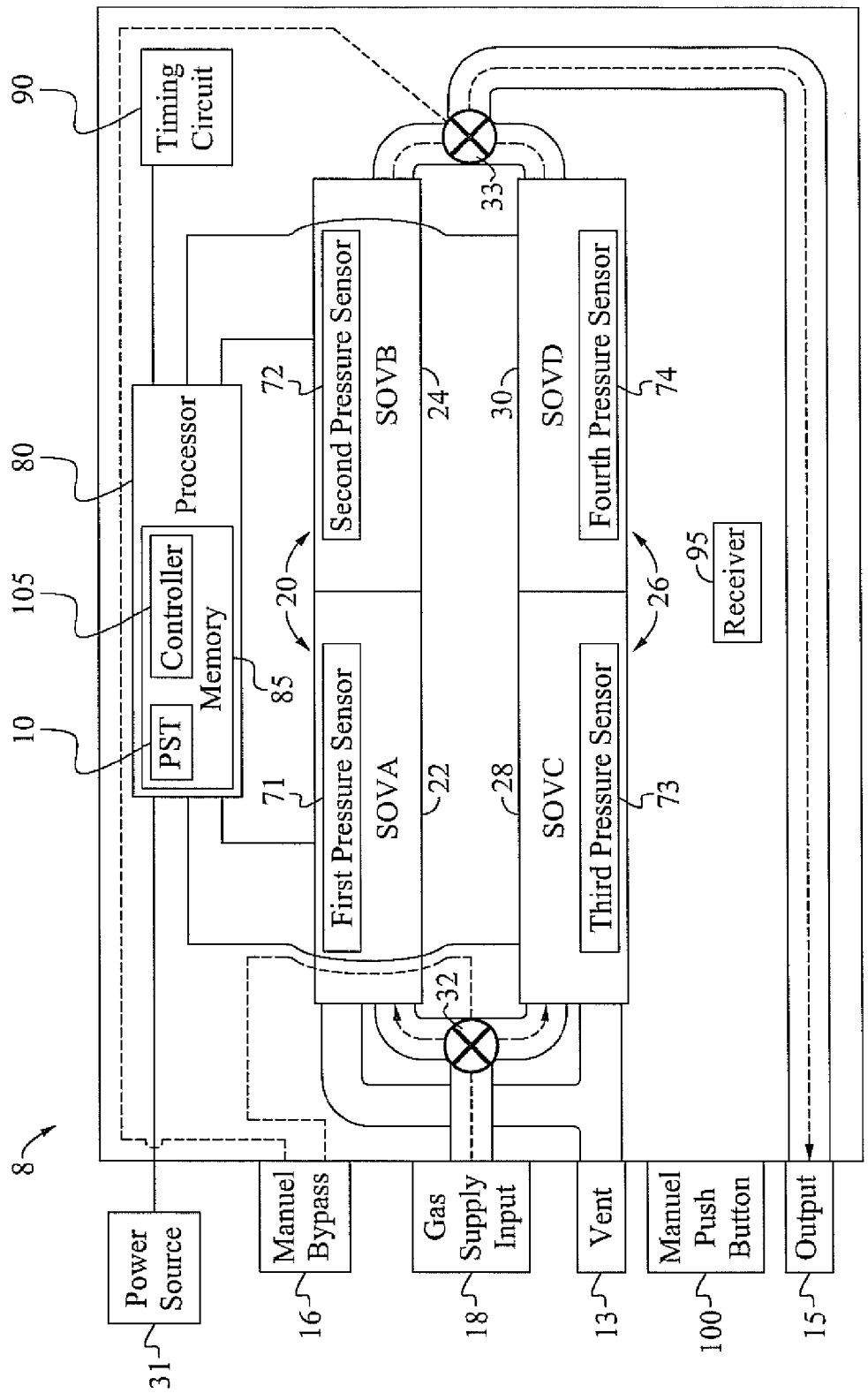
FIGS. 1A and 1B illustrate embodiments of a partial stroke testing system.

The embodiments are detailed below with reference to the listed figures.

DETAILED DESCRIPTION OF THE EMBODIMENTS

Before explaining the embodiments in detail, it is to be understood that the embodiments are not limited to the particular embodiments and that it can be practiced or carried out in various ways.

The embodiments relate to partial stroke testing systems for an online testing of a critical valve, such as an emergency shutdown valve.

Three major failures for an emergency shutdown (ESD) are as follows: mechanical failure, stem-packing seizure, and trash in the seat. Mechanical failure for quarter-turn valves and butterfly valves can be dangerous and nearly impossible to detect. For example, if an assembly pin holding the stem and globe together of a butterfly valve shears on the inside, then the valve has no means of detecting this failure. Failure data for pin shear is not well established, however, the failure factor regarding pin shear for the valves should be less than 5% of the total for valve failure.

The vast majority of the emergency shutdown valve failures or critical valve failures, or approximately 70% to 75% of the emergency shutdown valve failures or critical valve failures, can be considered stem-packing seizures. This type of failure can be influenced greatly by the application temperature, position of the valve, and amounts of solids within the fluids traveling through the valves.

The embodiments of the systems and methods include partial stroke testing (PST) of the fully open emergency shutdown valve or critical valves to manage the stem-packing seizure failures. By stroking the fully open valve to approximately 85% open, the critical valve can be diagnosed as being able to be stroked toward close, which provides evidence of no stem-packing seizures. The embodiments allow the critical valve diagnostic coverage factor to be increased from about 0% to about 70% or 75%. Accordingly, the increased diagnostic coverage factor of the emergency shutdown valve or critical valves increases the overall Safety Instrumented Level (SIL) rating of the safety loop for operation of these types of valves.

Prior to these embodiments, the only foolproof system for meeting the Safety Integrated Level (SIL) requirements for a Safety Integrated Level 2 loop was to use two emergency shutdown valves that had to be connected in a series. Besides the increase in costs to establish and maintain this configuration, the operational availability of the safety loop was decreased due to the increase in spurious trips created by the loop and the 1oo2 (1 out of 2) emergency shutdown valves.

Existing partial stroke testing systems have been designed as a device to operate within a safety loop. If the partial stroke testing device fails, the testing stops but the solenoid of the critical valve remains under the control and power of the emergency shutdown system. Four architectures for the solenoid arrangements have been designed with the 2oo2 as the most dangerous of the arrangements. Chances of failure with these arrangements have not been improved upon by adding a programmable electronic system (PES) or a programmable logic controller (PLC) to test the 2oo2 arranged solenoids. For example, in the 2oo2 system, if a solenoid fails in a stuck-ON condition, then the emergency shutdown valve cannot be held open. The testing programmable logic controller (PLC) can inform the operator of the stuck-ON solenoid, but the testing programmable logic controller cannot mitigate this dangerous failure and subsequent leakage can occur or through-put can continue, which permits unwanted liquids or fluids to pass through the critical or emergency shutdown valve. Since the 2oo2 arrangement can be a parallel configuration, both solenoids close successfully to remove the air supply and create the vent path for the critical or emergency shutdown valve's diaphragm to operate. As such, both solenoids close to vent successfully the diaphragm and close the ESD valve. Otherwise, one solenoid supplies air while the other solenoid is venting air, thereby keeping the vale in the open position.

Using a modified 2oo4 arrangement avoids the risk to the process, plant personnel, and community by keeping the ESD system in control of the ESD valve. Given the PST implementation goals are to (1) increase process runtime, (2) decrease risk of ESD valve performance failure(s), (3) reduce man hours doing ESD valve testing, and (4) avoid increased risk during maintenance; then only the modified 2oo4 arrangement meets all of those goals. A 2oo4 can be an "H" configuration with a crossover between the two parallel legs. The modified 2oo4 (for example, the 200(1oo2) configuration) does not have the crossover connection and thus operates as two parallel 1oo2 (serial) legs. Table 1 is a state logic table that depicts the modified 2oo4 arrangement for both the air supply and vent path. In Table 1, "O" represents the path is open; "X" represents the path is closed; and "*" represents that the state is a bypass state. The logic equation corresponding to Table 1 is Output=(SOV A and SOV B) or (SOV C and SOV D).

TABLE 1

STATE LOGIC TABLE
AIR SUPPLY PATH/VENT PATH

| STATE | SOV A | SOV B | SOV C | SOV D | OUTPUT |
|---|---|---|---|---|---|
| 1 | O | O | O | O | ON |
| 2 | O | O | O | X | ON |
| 3 | O | O | X | O | ON |
| 4 | X | O | O | O | ON |
| 5 | O | X | O | O | ON |
| 6* | O | O | X | X | ON |
| 7* | X | X | O | O | ON |
| 8 | O | X | O | X | OFF |
| 9 | O | X | X | O | OFF |
| 10 | X | O | O | X | OFF |
| 11 | X | O | X | O | OFF |
| 12 | O | X | X | X | OFF |
| 13 | X | O | X | X | OFF |
| 14 | X | X | O | X | OFF |
| 15 | X | X | X | O | OFF |

Table 2 is a state logic table that depicts an embodiment of the 2oo4 arrangement using a crossover for the vent path only. Like Table 1, "O" represents the path is open; "X" represents the path is closed, and "*" represents that the state is a bypass state. The logic equation corresponding to Table 2 is Output= (SOV B AND (SOV A OR SOV C)) OR (SOV D and (SOV A or SOV C)).

TABLE 2

STATE LOGIC TABLE
VENT PATH (WITH CROSSOVER)

| STATE | SOV A | SOV B | SOV C | SOV D | OUTPUT |
|---|---|---|---|---|---|
| 1 | O | O | O | O | ON |
| 2 | O | O | O | X | ON |
| 3 | O | O | X | O | ON |
| 4 | X | O | O | O | ON |
| 5 | O | X | O | O | ON |

TABLE 2-continued

STATE LOGIC TABLE
VENT PATH (WITH CROSSOVER)

| STATE | SOV A | SOV B | SOV C | SOV D | OUTPUT |
|---|---|---|---|---|---|
| 6* | O | O | X | X | ON |
| 7* | X | X | O | O | ON |
| 8 | O | X | O | X | OFF |
| 9* | O | X | X | O | ON |
| 10* | X | O | O | X | ON |
| 11 | X | O | X | O | OFF |
| 12 | O | X | X | X | OFF |
| 13 | X | O | X | X | OFF |
| 14 | X | X | O | X | OFF |
| 15 | X | X | X | O | OFF |

The embodiments include systems and methods for providing partial stroke testing to be performed on emergency shutdown valves or critical valves, while allowing the components of the partial stroke testing system to be replaced without taking the system offline or without completely by-passing the solenoids which control the emergency shutdown valves or critical valves.

Providing a partial stroke testing system can save lives by increasing the Safety Integrity and reliability for the critical valves to which the partial stroke testing is connected. The embodiments of the system can save energy by avoiding frequent process shutdown scenarios. In addition, the embodiments of the systems and methods can prevent contamination to the environment by avoiding dangerous process scenarios which can require venting of hazardous or possibly toxic substances to the environment due to the lack of proper testing of a valve or the lack of performing online repairs without closing a critical valve, entirely.

The embodiments of the systems and methods include a self calibration of the testing system by connecting the system to the critical valve and initiating a partial stroke testing of this emergency shutdown (ESD) valve while monitoring the solenoid valves for signs of pressure changes above and/or below a defined preset limit. After the calibration procedure is performed, the calibration data can be recorded and can be compared to preset limits to establish a tolerance band. This calibration data can remain stored in the memory of the testing device for future testing until the unit is re-calibrated. In one embodiment, the device is calibrated by conducting a PST of the ESD valve in place under actual process operating conditions. Timing limitations are imposed on the calibration (based on the time constant of the ESD valve) to prevent a spurious trip of the process, should a problem occur.

After the calibration is completed, the partial stroke testing system can perform manual partial stroke testing, or testing that occurs on a periodic basis, such as daily testing performed at 4 pm each day or monthly testing performed on the 15th of each month. Alternatively, testing can be performed on demand, which includes demands from a local source near the valve, demands from the Safety Instrumented Systems (SIS), or demands from a remote user interfacing with the partial stroke testing from a terminal via the Internet™.

The systems and methods are contemplated for use in petroleum plants and refineries, petrochemical plants and refineries, power plants, and combinations thereof.

The embodied partial stroke testing systems offers a manner of testing critical valves or emergency shutdown valves, hereinafter called an ESD valve, by opening and closing the ESD valve or moving a part of the valve, typically a distance of 15%-25% of the length of the valve, and then back to an original starting position during a brief period of time. The purpose of the test can be to confirm the ESD valve's ability to close properly when needed and the ESD valve's suitability for continued ESD valve service. The ESD valve can be an emergency valve such as those installed in production plants, refineries, chemical plants, pipelines, or other facilities that need to be shutdown quickly to avoid problems, such as toxic substance leaks. In an emergency, the ESD valve must be able to close quickly and reliably to prevent damage to the facility's equipment, the facility's personnel, or the surrounding environment.

The embodiments of the methods for partial stroke testing of a critical valve using a bypass valve can include flowing two streams of a gas, which can include the same gas or at least two different gases and combinations of gases, simultaneously through a bypass valve. The gas from the bypass valve can be used to open the critical valve. After the critical valve has been opened, the method can continue by determining a calibration time interval for closing the opened critical valve to a preset partial stroke testing position under process operating conditions, and verifying that the two streams of gas are providing pressure. A measured time interval for closing the opened critical valve to the preset partial stroke testing position under process operating conditions is determined. A tolerance band can be created around the calibration time interval using partial stroke testing logic. The embodied methods can include monitoring the time interval needed to close the critical valve to ensure the critical valve does not exceed a maximum time limit needed for closing the critical valve.

The methods can include performing comparative analyses regarding the measured time intervals to determine if the critical valve passes the partial stroke testing. If the critical valve fails the partial stroke testing, the partial stroke testing of the critical valve can be cancelled.

The methods conclude by displaying the results of the partial stroke testing on a graphical user interface (GUI) for review purposes.

In an embodiment of the method, computer instructions can be executed to transmit signals in the event of a disruption of the flow of the two streams of gas through the bypass valve or an incomplete opening of the critical valve. Under normal operating conditions, two streams—one from each parallel leg—exist. In the bypass mode, one stream exists, since either one (but never both) of the two legs is blocked. The on-board computer can detect the blocked condition and can activate an alarm output or can transmit this information over a communications link.

The embodied methods can include executing computer instructions to transmit signals in the event of an error in determining the calibration time interval for closing the opened critical valve to a preset partial stroke testing position under process operating conditions, or an error in determining a measured time interval for closing the opened critical valve to the preset partial stroke testing position under process operating conditions.

The methods can include venting at least one stream of gas to release the gas and relieve pressure build-up when the critical valve is closed. The stream of gas can be instrument air, nitrogen, argon, or another inert gas. The two streams of gas can be different types of gases. As an example, one stream can be air and the other stream can be an inert gas, such as nitrogen.

The embodiments of the methods can include determining a preset limit for a preset partial stroke testing position in a range from about 0.5 seconds to about 20 seconds. The methods can comprise timing an initiation of the partial stroke testing of a critical valve.

The embodied methods can include determining partial closure of the critical valve or emergency shutdown valve to prevent, detect, or mitigate any dangerous failures, if a failure occurs. The online partial stroke testing system embodied prevents or avoids dangerous failures, and can be maintained online without disconnecting the emergency shutdown valve, or critical valve, from the Safety Instrumented System (SIS).

An embodiment of the system can include one or more power sources connected to the four solenoids and a processor with a memory. The power source can be a direct current power source including the wiring from a pre-existing solenoid.

With reference to the figures, FIG. 1A depicts an embodiment of a partial stroke testing system (8) including connections for connecting to a critical valve. The partial stroke testing system can include a bypass valve with a first stage (20) and a second stage (26). The first stage can include a first solenoid valve (22), also referred to as SOVA, and a second solenoid valve (24), also referred to as SOVB. The first solenoid valve and the second solenoid valve can be arranged in a series. The second stage (26) can include a third solenoid valve (28), also referred to as SOVC, and a fourth solenoid valve (30), also referred to as SOVD. The third solenoid valve (28) and the fourth solenoid valve (30) can be arranged in a series. The first stage (20) and the second stage (26) can be connected in a parallel configuration to each other. Dashed lines with arrows show the flow of a gas as the gas is being supplied to the partial stroke testing system (8).

The four solenoid valves (22, 24, 28, and 30) can be connected to a gas supply input (18) through a first gas valve (32). A second gas valve (33) can control the gas output of the four solenoids (22, 24, 28, and 30). The second gas valve (33) can connect to an output (15) of the partial stroke testing system (8). The output (15) of the partial stroke testing system (8) can connect to an emergency shutdown valve. The gas valve can be a model AL3TSL available from Conant Controls located in Medford, Mass.

The embodiments of the system can include a processor (80) with a memory (85). The memory (85) can include partial stroke testing (PST) logic (10) for calibrating a time interval for closing an opened critical valve and for determining a measured time interval for closing the opened critical valve. The processor can be connected to the testing system for transmitting additional testing state signals to a user interface. Some examples of signals are "PST failed," "system error," "solenoid failure," and the like.

Partial stroke testing (PST) logic (10) can be in communication with the four solenoids (22, 24, 28, and 30). Partial stroke testing (PST) logic (10) can open or shut any of the four solenoids (22, 24, 28, and 30) depending on the signals being processed. The partial stroke testing (PST) logic (10) can include computer instructions to execute a first command test to partially close the critical valve from the fully opened position. The partial stroke testing (PST) logic can also include a mechanism for fully closing the critical valve when the power source is interrupted.

The embodiments of the partial stroke testing (PST) system can include having stored in the memory of the processor certain preset limits for the test. A preset limit of about 0.5 seconds to about 200 seconds can be used. The preset limits can depend upon the sizes of the critical valves to which the partial stroke testing (PST) system is connected.

A manual bypass (16) can control the valves (32 and 33) from a gas supply input (18) to the four solenoids (22, 34, 28, 30), and from the output of the four solenoids (22, 24, 28, 30) to the emergency shutdown valve. A bypass pressure sensor can be installed to indicate that the bypass of a set of solenoids has been engaged and is active.

An embodiment of the partial stroke testing (PST) system can include a timing circuit (90) in communication with the processor for initiating a partial stroke test for a critical valve, with a receiver (95) to accept a remote signal from the controller to start a partial stroke test, a manual push button (100) to start a partial stroke test, or combinations of these components.

An embodiment of the partial stroke testing (PST) system can include a controller (105) for actuating the partial stroke testing (PST) system via a network. The controller (105) can react to valves, pressure sensor data, and other types of test alarms or indicators. The controller (105) can communicate with the processor (80) to determine if these valves exceed, do not meet, or come within a tolerance band for operation of the critical valve. The controller (105) can be computer instructions for comparing the data received from the valves, or sensors that are stored in the memory of the processor (80).

When any of the solenoids fail, a bypass can be used to temporarily turn off the gas supply to that set of solenoids. Once that set of solenoids is disconnected from the gas supply, that set of solenoids can be removed from the partial stroke testing system and replaced with a new set of solenoids. Once all of the solenoids are operating properly, the gas supply can be returned to the normal operation setting for both the first set of solenoids and the second set of solenoids. The bypass pressure sensor can indicate that the bypass is no longer active and all of the solenoids are receiving gas flow.

The bypass can be a manual lever (16) that can controls the gas supply to the four solenoids. A first gas valve (32) and a second gas valve (33) can comprise the bypass. The first gas valve (32) can be connected to the input of the four solenoids (22, 24, 28, and 30). The second gas valve can be connected to the output of the four solenoids (22, 24, 28, and 30). The bypass can be changed by a mechanical action, only.

A first pressure sensor (71), such as a model PSW-523 available from Omega located in Stamford, Conn., can be connected to the first solenoid valve (22). A second pressure sensor (72) can be connected to the second solenoid valve (24). A third pressure sensor (73) can be connected to the third solenoid valve (28). A fourth pressure sensor (74) can be connected to the fourth solenoid valve (30). Each pressure sensor monitors pressure at each solenoid valve and compares the monitored pressure to a preset limit. If the pressure at one of the solenoid valves deviates from the preset limit, an alarm can be actuated. The pressure sensors can be mounted within the solenoid valves to monitor the operation of each solenoid. The pressure sensors can communicate with the processor.

The embodiments of the system include a power source (31) that can be connected to the partial stroke testing system.

During normal operation, the solenoids (22, 24, 28, and 30) can open and close at the same time, based on signals from the emergency shutdown or the partial stroke testing Logic (10) to control the gas flow to the ESD valve. When the plant is operating and no tests are being run on the ESD valve, the solenoids are in the open position and can allow gas to flow to the ESD valve. When a test is being run or when there is an emergency shutdown of the plant causing the ESD valve to need to be closed, then the solenoids (22, 24, 28, and 30) can shut and allow gas to exit through a vent (13). The gas venting can release the pressure on the ESD valve diaphragm, and partial stroke the ESD or critical valve if there is a test occurring; or fully close the ESD or critical valve if there is an emergency shutdown in process. When the ESD valve is to be reopened, the flow of the gas to the output (15) is reactivated to increase the gas pressure on the diaphragm of the ESD valve.

In one embodiment, the vent is the path for releasing air from the diaphragm and closing the ESD valve. The ESD valve operates as an air (pressure) to open and spring to close. The air pressurizes the diaphragm to overcome the force of the spring (which is trying to close the valve). When air is vented from the diaphragm, the pressure is reduced, and the spring closes the ESD valve. This example embodiment can be used for a PST or when completely closing the ESD valve; the difference is the amount of air released.

The arrangement of the solenoids allows the emergency shutdown system to continue to operate the ESD valve and test the ESD valve when one of the solenoids has failed. It does not effect the operation of the partial stroke testing system when the solenoids fail to open or close.

If a solenoid in the first stage of the two stage bypass valve fails to open, then the other solenoid in the first stage of the two stage bypass valve can continue to operate the ESD valve. If a solenoid in the second stage of the two stage bypass valve fails to open, the other solenoid in the second stage of the two stage bypass valve can continue to operate the ESD valve.

Figure 1B:
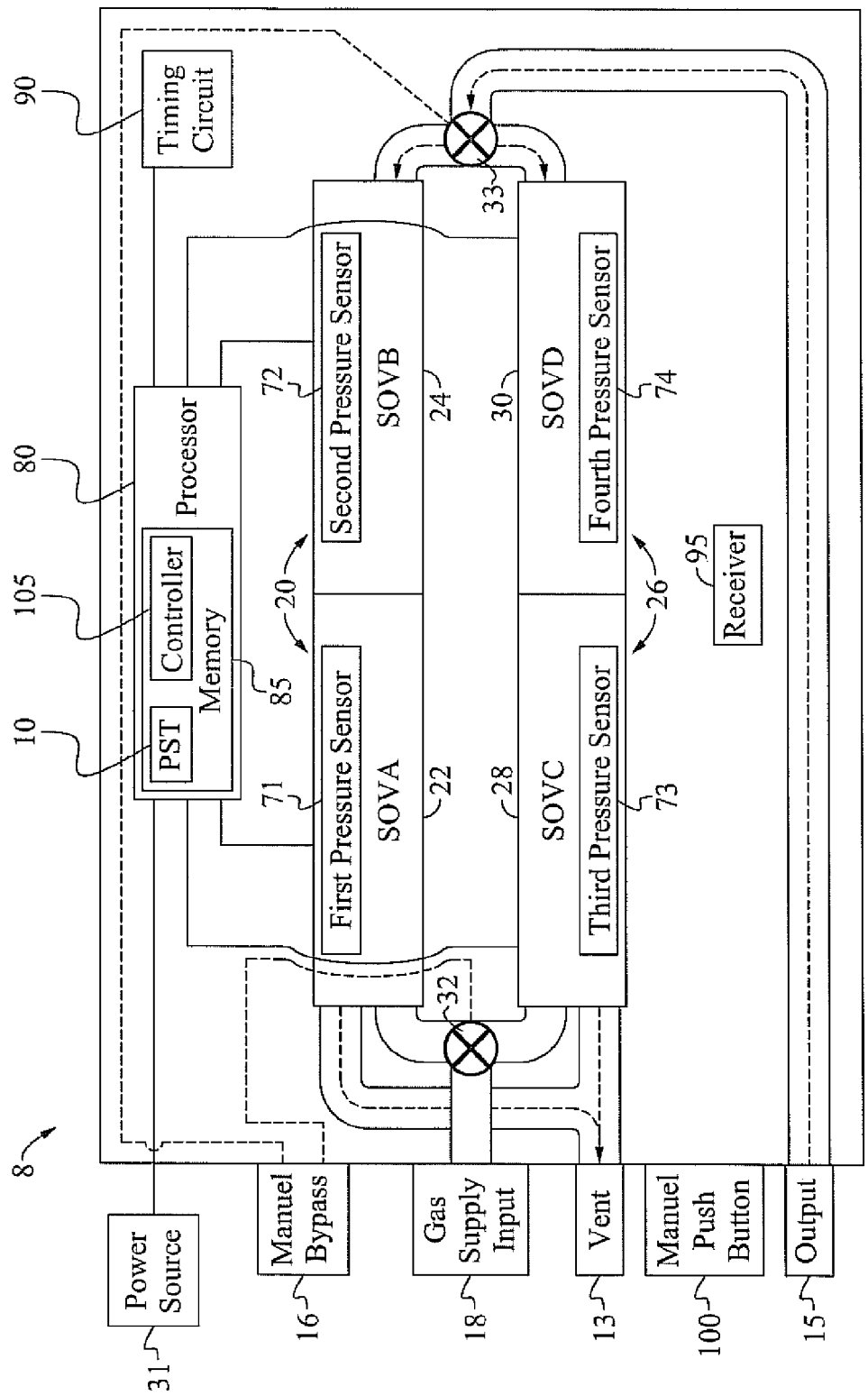

FIG. 1B depicts the embodiment of the partial stroke testing system (8) as depicted in FIG. 1A, with dashed lines with arrows showing the flow of the gas as it is being vented from the partial stroke testing system (8).

Figure 2:
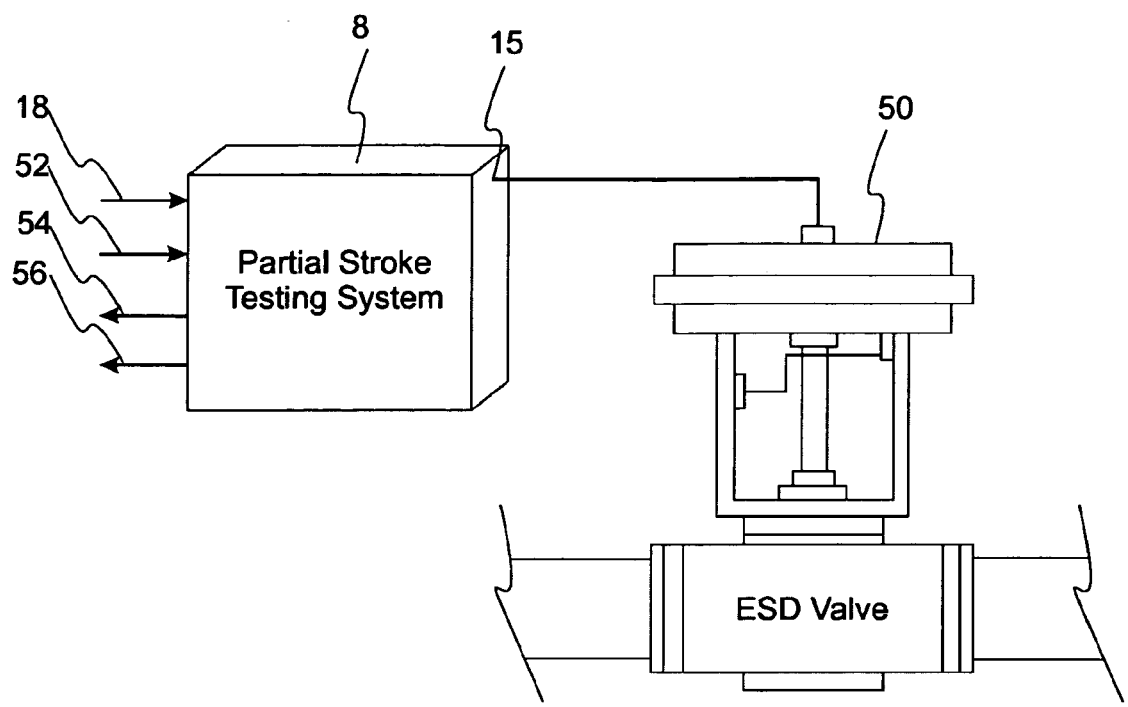
FIG. 2 depicts an embodiment of a partial stroke testing system connected to a critical valve.

FIG. 2 illustrates the incoming and outgoing gas and electrical connection of a partial stroke testing system (8). The output (15) of the partial stroke testing system (8) can be connected to the diaphragm (50) of the ESD valve.

The partial stroke testing system (8) can have inputs of the gas supply (18) and the electrical signal of the Safety Instrumented System (SIS) valve command (52). The Safety Instrumented System (SIS) valve command (52) can be, for example, an instruction to fully open the ESD valve, or an instruction to fully close the ESD valve.

The partial stroke testing system (8) can have the outputs of "test failure" (54) and "system error" (56). A "test failure" (54) signal can be sent to a control center when the ESD valve fails the partial stroke test. A system error (56) signal can be sent to the control center when a pressure sensor detects a problem with one of the solenoids.

Figure 3:
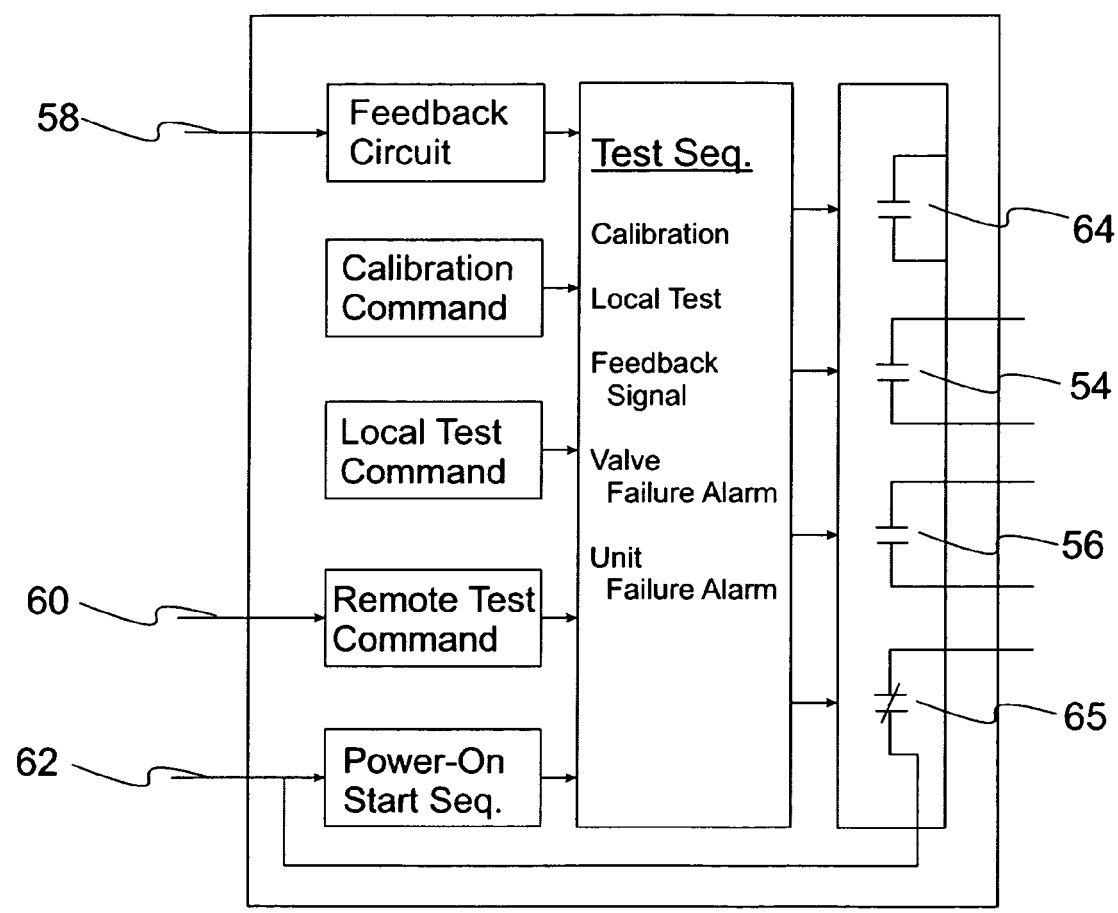
FIG. 3 depicts an embodiment of a partial stroke testing logic software program usable in a partial stroke testing system.

FIG. 3 depicts an operation of the partial stroke testing (PST) logic software of an embodiment of a partial stroke testing system. An OPEN limit valve can connect to the feedback circuit (58). The OPEN limit switch in the "true" state allows the partial stroke testing logic software to perform the partial stroke testing (PST) of the ESD valve.

A Remote Test Command (60) can also be an input to the partial stroke testing (PST) logic software to perform a partial stroke test of the ESD valve.

An output from the Safety Instrumented System (SIS) (62) can be input to the partial stroke testing logic software to perform a full closure of the ESD valve.

The partial stroke testing (PST) logic software can also generate signals. A local test failed signal (64) can be generated to activate a local visual alarm, and a logical alarm within the software. A "test-failure" signal (54) can be sent to a control center when the ESD valve fails the partial stroke test. A "system error" signal (56) can be sent to the control center when a pressure sensor detects a problem with one of the solenoids. A second valve command (65) signal can be sent to the solenoids telling them to open or close.

While these embodiments have been described with emphasis on the embodiments, it should be understood that within the scope of the appended claims, the embodiments might be practiced other than as specifically described herein.

What is claimed is:

1. A fault-tolerant method for opening, closing and partial stroke testing (PST) of a critical valve using a 2 out of 4 (2oo4) solenoid valve arrangement comprising the steps of:
   a. configuring a 2oo4 solenoid valve arrangement with a first leg having a first solenoid valve and a second solenoid valve in series and a second leg having a third solenoid valve and a fourth solenoid valve in series, wherein the first leg is parallel to the second leg providing two redundant supply paths and two redundant vent paths, for selectively supplying gas to and venting gas from the critical valve;
   b. flowing at least a portion of a gas stream from a supply input through the first leg and at least a portion of the gas stream from the supply input through the second leg;
   c. opening the critical valve with the gas from either of the two redundant supply paths;
   d. determining a calibration time interval by closing the critical valve to a preset partial stroke testing position and recording a first elapsed time under process operating conditions, wherein the first elapsed time is the time elapsed during the closing of the critical valve to a preset partial stroke testing position;
   e. verifying the two streams of gas are providing required operating pressure;
   f. determining a measured PST time interval by closing the critical valve to the preset partial stroke testing position and recording a second elapsed time under process operating conditions, wherein the second elapsed time is the time elapsed during the closing of the critical valve to a preset partial stroke testing position under process operating conditions after the first elapsed time has been recorded;
   g. using partial stroke testing logic to monitor the measured PST time interval to ensure the critical valve does not exceed a maximum time limit needed for closing the critical valve;
   h. comparing the measured PST time interval to the calibration time interval to determine if the measured PST time interval does not exceed the maximum time limit needed for closing the critical valve and the critical valve passes the partial stroke testing; and
   i. acquiring data for each of the solenoid valves, wherein the first solenoid valve is in communication with a first pressure sensor, the second solenoid valve is in communication with a second pressure sensor, the third solenoid valve is in communication with a third pressure sensor, and the fourth solenoid valve is in communication with a fourth pressure sensor, and wherein the partial stroke testing logic selectively opens or closes the solenoid valves depending on the acquired data.

2. The method of claim 1, further comprising the step of executing computer instructions to transmit signals in the event of an error during the determination of the calibration time interval for closing the opened critical valve to the preset partial stroke testing position under process operating conditions, or an error during the determination of the measured PST time interval for closing the opened critical valve to the preset partial stroke testing position under process operating conditions; wherein the error comprises a partial stroke testing failure, a solenoid failure; or combinations thereof, wherein the partial stroke testing failure comprises the critical valve failing to close to the preset partial stroke testing position; and wherein the solenoid failure comprises any of the four solenoids failing to open or close.

3. The method of claim 1, further comprising the step of venting at least one stream of gas in the presence of a solenoid failure.

4. The method of claim 1, further comprising the step of displaying results of the partial stroke testing to a graphical user interface.

5. The method of claim 1, further comprising the step of determining partial closure of the critical valve.

6. The method of claim 1, further comprising the step of determining a preset limit for a preset partial stroke testing position from about 0.5 seconds to about 60 seconds.

7. The method of claim 1, further comprising the step of timing an initiation of the partial stroke testing of the critical valve.

8. The method of claim 1, wherein simultaneously while the step of flowing the two streams of the gas through the 2oo4 solenoid valve arrangement is performed, performing the step of executing computer instructions to transmit signals in the event of a disruption of the flow of the two streams of gas through the 2oo4 solenoid valve arrangement or incomplete opening of the critical valve.

9. The method of claim 1, wherein subsequent partial stroke testing of the critical valve is cancelled if the critical valve fails the partial stroke testing.

* * * * *